United States Patent
Kesler et al.

(10) Patent No.: US 11,607,929 B2
(45) Date of Patent: Mar. 21, 2023

(54) THERMAL CYCLE RESISTANT FASTENING SYSTEM FOR REFRIGERANT FITTING

(71) Applicant: Hanon Systems, Daejeon (KR)

(72) Inventors: Eric Kesler, Northville, MI (US); Dan Frederick, Lincoln Park, MI (US)

(73) Assignee: HANON SYSTEMS, Daejeon (KR)

( * ) Notice: Subject to any disclaimer, the term of this patent is extended or adjusted under 35 U.S.C. 154(b) by 820 days.

(21) Appl. No.: 16/519,305

(22) Filed: Jul. 23, 2019

(65) Prior Publication Data

US 2020/0047592 A1 Feb. 13, 2020

Related U.S. Application Data

(60) Provisional application No. 62/716,619, filed on Aug. 9, 2018.

(51) Int. Cl.
| | |
|---|---|
| *F16L 23/032* | (2006.01) |
| *B60H 1/32* | (2006.01) |
| *F16L 51/00* | (2006.01) |
| *F16B 5/06* | (2006.01) |
| *F16L 23/036* | (2006.01) |

(52) U.S. Cl.
CPC ......... *B60H 1/3229* (2013.01); *F16B 5/0635* (2013.01); *F16L 23/032* (2013.01); *F16L 23/036* (2013.01); *F16L 51/00* (2013.01)

(58) Field of Classification Search
CPC ....... F16L 23/02; F16L 23/036; F16L 23/032; F16L 51/00; F16B 5/0635
USPC ................................................ 285/206, 208
See application file for complete search history.

(56) References Cited

U.S. PATENT DOCUMENTS

| | | | | |
|---|---|---|---|---|
| 3,291,509 A | * | 12/1966 | Borsum | F16J 13/00 376/205 |
| 3,659,877 A | * | 5/1972 | Kubasta | F16B 31/021 285/368 |
| 4,184,785 A | * | 1/1980 | Marjollet | F16L 23/036 403/337 |
| 4,540,199 A | * | 9/1985 | Neill | B25B 27/16 29/256 |

(Continued)

FOREIGN PATENT DOCUMENTS

| | | |
|---|---|---|
| DE | 10261887 A1 | 7/2004 |
| JP | S48035812 | 4/1973 |

(Continued)

*Primary Examiner* — David Bochna
(74) *Attorney, Agent, or Firm* — Shumaker, Loop & Kendrick, LLP; James D. Miller

(57) ABSTRACT

A block fitting assembly comprises a first block having a first fastener aperture formed therethrough, a second block having a second fastener aperture formed therethrough in axial alignment with the first fastener aperture, and a fastener extending through the first fastener aperture and the second fastener aperture to couple the first block to the second block. The block fitting assembly includes a thermal expansion compliancy feature in the form of at least one of an inner surface of the second block defining the second fastener aperture including an axially extending non-threaded portion adjacent a threaded portion thereof or the fastener including a necked portion having a smaller outer diameter than a minor thread diameter of a threaded portion of the fastener.

18 Claims, 5 Drawing Sheets

(56) References Cited

U.S. PATENT DOCUMENTS

| | | | | |
|---|---|---|---|---|
| 4,671,324 A | * | 6/1987 | Neill | B25B 27/16 138/44 |
| 6,386,593 B1 | * | 5/2002 | Slais | F16J 15/0818 277/609 |
| 7,621,568 B2 | | 11/2009 | Schroeder et al. | |
| 7,766,391 B2 | * | 8/2010 | Kim | B60H 1/00571 285/379 |
| 2003/0080554 A1 | * | 5/2003 | Schroeder | B60H 1/00571 285/125.1 |
| 2004/0178631 A1 | * | 9/2004 | Frohling | F16L 19/0206 285/374 |

FOREIGN PATENT DOCUMENTS

| | | | | |
|---|---|---|---|---|
| JP | S48015846 Y1 | | 5/1973 | |
| JP | S62170484 | | 10/1987 | |
| JP | S6430991 A | | 2/1989 | |
| JP | H0242293 A | | 2/1990 | |
| JP | 3027062 U | | 7/1996 | |
| JP | 2013068268 A | * | 4/2013 | F16L 23/0283 |
| JP | 2013068268 A | | 4/2013 | |
| JP | 2016125621 A | | 7/2016 | |
| KR | 20130066503 A | | 6/2013 | |
| KR | 20150109173 A | | 10/2015 | |
| KR | 20180043301 A | | 4/2018 | |

\* cited by examiner

THERMAL CYCLE RESISTANT FASTENING SYSTEM FOR REFRIGERANT FITTING

CROSS-REFERENCE TO RELATED APPLICATION

This patent application claims priority to U.S. Provisional Patent Application Ser. No. 62/716,619, filed on Aug. 9, 2018, the entire disclosure of which is hereby incorporated herein by reference.

FIELD OF THE INVENTION

The invention relates to a block fitting assembly for a vehicle air conditioning system, and more particularly, to a block fitting assembly including a fastening assembly allowing compliance or flexibility thereof while maintaining a desired clamping force during thermal cycling of the block fitting assembly.

BACKGROUND OF THE INVENTION

In assembly line manufacturing of vehicles, it is desirable that line fittings in an air conditioning system can be secured using a power nut driver rather than using a torque wrench. For this reason, peanut or block type fittings are often used and assembled using electric (DC) torque tools.

Various refrigerants such as R12, R134a, R1234F, and R744 ($CO_2$) are used in the air conditioning system for the vehicle. However, environmental concerns exist. As a result, legislation was passed by various governmental agencies of the United States and the European Union, for example, requiring that the air conditioning system operate with substantially no refrigerant leaks or permeation.

Automotive refrigerant components used in $CO_2$ air conditioning systems must be tested according to German Association of the Automotive Industry (Verband der Automobilindustrie—VDA) German Institute for Standardization (Deutsches Institut für Normung—DIN) VDA DIN SPEC 74102 (August 2015) which includes a pressure and temperature cycle test. Many refrigerant fitting designs fail this test because of severe thermal expansion gradients that occur within the refrigerant block fittings and the associated fasteners used for coupling the block fittings. Many of the refrigerant block fittings and the fasteners are constructed from dissimilar materials such as aluminum, stainless steel, and low carbon steel alloys. Thus, thermal expansion rates also differ between the different components, such as between the cooperating block fittings and the associated fasteners.

The block type fitting assemblies typically include a male block configured to mate with a female block. The male and female blocks include aligned apertures for receiving a threaded fastener such as a stud or bolt therethrough, wherein the threaded fastener is configured to couple the male block to the female block while also supplying a sufficient compressive force to be applied to a sealing element of the block fitting assembly. One issue posed by the use of the threaded fastener relates to the manner in which the external threads of the fastener are substantially constrained in the axial direction of the fastener when engaged with the internal threads formed in one or both of the cooperating apertures formed through the blocks. As a result, those portions of the threaded fastener engaged with the threads of the blocks may not be able to thermally expand or contract in a desired manner relative to the remainder of the block fitting assembly. The inability for the threaded fastener to thermally expand or contract relative to the blocks in a desired manner may lead to a circumstance wherein the clamping force present between the blocks is reduced due to the variable thermal expansion rates present between the blocks, the threaded fastener, and potentially a nut or similar structure used in conjunction with the threaded fastener. This reduction in the clamping force applied to a corresponding sealing element of the block fitting assembly may lead to undesirable leakage therefrom.

There is accordingly a continuing need for a block fitting assembly having a fastening assembly allowing for compliance or flexibility thereof while maintaining a desired clamping force in response to thermal load cycling.

SUMMARY OF THE INVENTION

Consistent and consonant with the instant disclosure, a block fitting assembly having a fastening assembly allowing compliance or flexibility thereof while maintaining a desired clamping force during thermal load cycling has surprisingly been discovered.

In one embodiment of the invention, a block fitting assembly comprises a first block having a first fastener aperture formed therethrough, a second block having a second fastener aperture formed therethrough in axial alignment with the first fastener aperture, and a fastener extending through the first fastener aperture and the second fastener aperture to couple the first block to the second block. An inner surface of the second block defining the second fastener aperture includes a non-threaded portion disposed adjacent the first fastener aperture and a threaded portion disposed adjacent the non-threaded portion. The fastener further includes a first threaded portion configured to engage the threaded portion of the second fastener aperture.

In another embodiment of the invention, a block fitting assembly comprises a first block having a first fastener aperture formed therethrough, a second block having a second fastener aperture formed therethrough in axial alignment with the first fastener aperture, and a fastener extending through the first fastener aperture and the second fastener aperture to couple the first block to the second block. The fastener includes a threaded portion and a necked portion. The necked portion has an outer diameter smaller than a minor thread diameter of the threaded portion.

According to yet another embodiment of the invention, a block fitting assembly comprises a first block having a first fastener aperture formed therethrough, a second block having a second fastener aperture formed therethrough in axial alignment with the first fastener aperture, an internally threaded nut configured to engage a face of the first block facing away from the second block, and a fastener extending through the first fastener aperture and the second fastener aperture to couple the first block to the second block. The second fastener aperture includes a non-threaded portion disposed adjacent the first fastener aperture and a threaded portion disposed adjacent the non-threaded portion. The fastener includes a first threaded portion configured to engage the threaded portion of the second fastener aperture and a second threaded portion configured to engage the nut. The fastener further includes a necked portion disposed between the first threaded portion and the second threaded portion having an outer diameter smaller than a minor thread diameter of the first threaded portion.

DRAWINGS

The above, as well as other advantages of the present invention, will become readily apparent to those skilled in the art from the following detailed description of a preferred embodiment when considered in the light of the accompanying drawings in which.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the order of the steps presented is exemplary in nature, and thus, is not necessary or critical.

Figure 1:
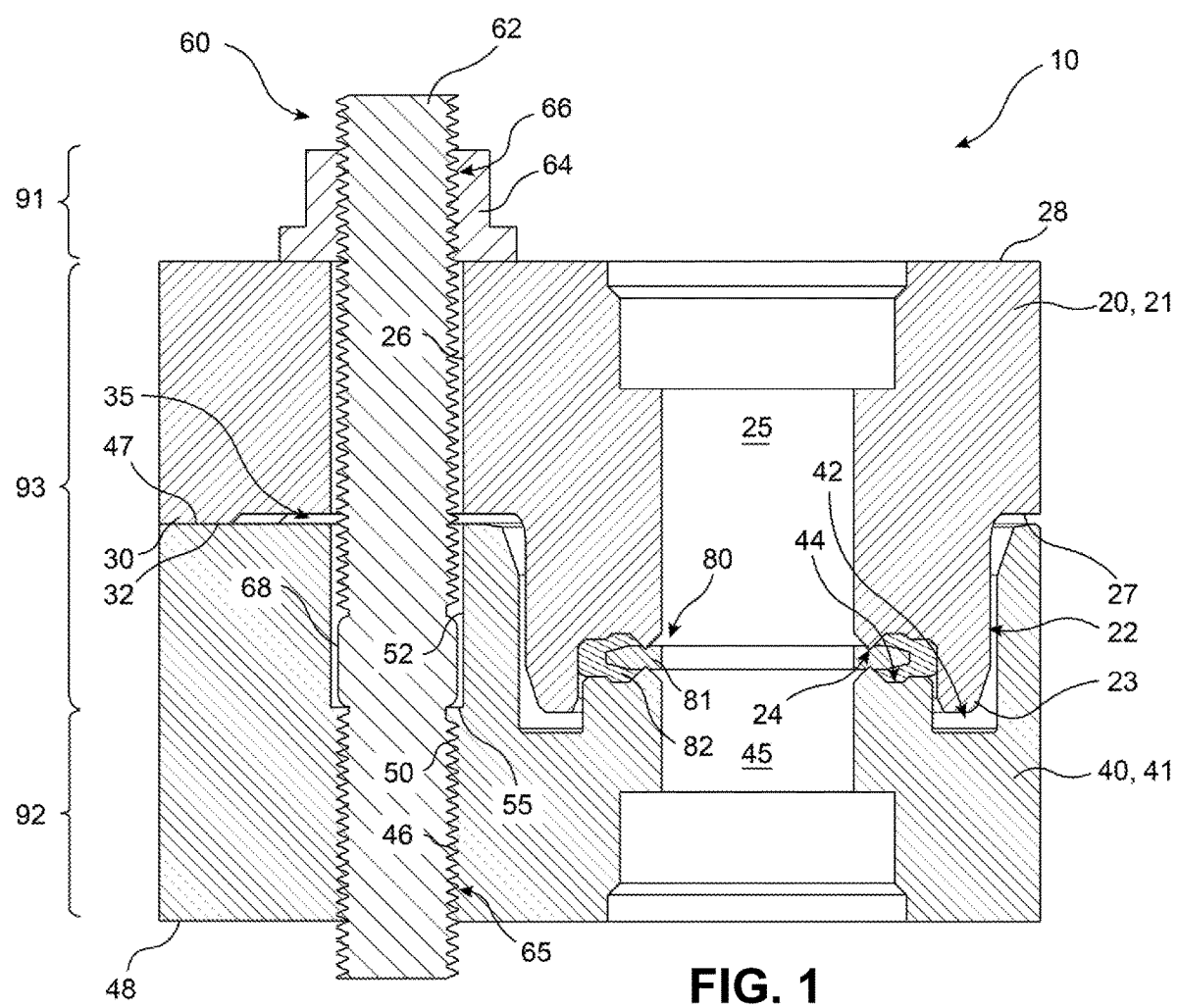
FIG. 1 is a cross-sectional elevational view of a block fitting assembly having a fastener with an increased free length according to an embodiment of the present invention.

FIG. 1 illustrates a block fitting assembly 10 according to an embodiment of the present invention. The block fitting assembly 10 is configured for fluidly coupling two fluid conveying components of an associated fluid system. The associated fluid system may be a refrigerant circuit of a heating, ventilating, and air conditioning (HVAC) system of a motor vehicle or a coolant circuit associated with a drive mechanism or energy source of the motor vehicle, as non-limiting examples. The block fitting assembly 10 generally includes a male block 20, a female block 40, a fastener assembly 60, and a sealing element 80.

The fastener assembly 60 comprises an externally threaded stud 62 and an internally threaded nut 64. The stud 62 includes a first threaded portion 65 adjacent a first end of the stud 62, a second threaded portion 66 adjacent an opposing second end of the stud 62, and a stopping feature 68 formed intermediate the first threaded portion 65 and the second threaded portion 66. In the provided embodiment, the first threaded portion 65 and the second threaded portion 66 are shown as having threads of identical construction, including the threads of the first threaded portion 65 and the threads of the second threaded portion 66 having identical pitches, angles, depths, and pitch diameters. However, it should be clear from a review of FIG. 1 that the first threaded portion 65 may optionally include a reduced thread diameter and threads having an altered pitch, angle, or depth in comparison to the second threaded portion 66 due to a direction of entry of the stud 62 through the blocks 20, 40. It is assumed hereinafter that the first threaded portion 65 and the second threaded portion 66 include threads of identical construction spaced from each other axially by the inclusion of the stopping feature 68.

The external threads of the stud 62 include an alternating pattern of roots and crests, wherein a minimum thread diameter (hereinafter referred to as the "minor thread diameter") of each of the threaded portions 65, 66 is measured with respect to each of the roots while a maximum thread diameter (hereinafter referred to as the "major thread diameter") of each of the threaded portions 65, 66 is measured with respect to each of the crests. At least one diametrically opposed portion of the stopping feature 68 includes an outer diameter greater than the minor thread diameter of the threaded portions 65, 66 in order to prevent passage of the stopping feature 68 past a corresponding internally threaded surface of the female block 40. The stopping feature 68 may further include an outer surface having a hexagonal or octagonal cross-sectional shape configured to cooperate with a corresponding tool for rotating the stud 62, as desired. The stopping feature 68 aids in setting a depth of entry of the stud 62 into the male block 20 when the stud 62 travels in a downward direction from the perspective of FIG. 1. However, it should also be apparent from review of FIG. 1 that the stud 62 may be presented with only a single continuous threaded portion in the absence of the stopping feature 68 without necessarily departing from the scope of the present invention, so long as the stud 62 is inserted axially to a desired extent suitable for reception of the nut 64 over an end thereof.

The internal threads of the nut 64 are configured to mate with the external threads of the stud 62, and more specifically, with the external threads of the second threaded portion 66. As such, the minor thread diameter, the major thread diameter, the pitch, the angle, and the depth of the threads of the nut 64 are selected to correspond to those of the threads of the stud 62. The nut 64 may be presented in unison with a corresponding washer (not shown) or similar structure when the nut 64 is used to compress the male block 20 towards the female block 40, as desired, without departing from the scope of the present invention.

The annular sealing element 80 is configured to be received and compressed between the male block 20 and the female block 40. In the illustrated embodiment, the sealing element 80 includes a metallic portion 81 surrounded by an elastomeric portion 82. However, the sealing element 80 may be produced from any material or combination of materials having desired characteristics of deformability and chemical resistance, including the exclusive use of a metal, the exclusive use of an elastomer, or the use of a combination thereof such as is disclosed in FIG. 1.

The male block 20 is formed from a main body 21 having a tubular protuberant portion 22. The protuberant portion 22 includes a piloting feature 23 surrounding a first seal engaging surface 24 indented axially from the piloting feature 23. The first seal engaging surface 24 extends primarily in the radial direction of the protuberant portion 22 and may include one or more teeth or grooves suitable for engagement with the annular sealing element 80. A first fluid aperture 25 extends transversely from the first seal engaging surface 24 and extends through the main body 21. The first fluid aperture 25 is configured to receive a fluid conveyed through the block fitting assembly 10. In some embodiments, the first fluid aperture 25 is configured to receive a conduit or tube (not shown) for conveying the fluid from another component of the fluid system utilizing the block fitting assembly 10. In other embodiments, the male block 20 may be integrally formed with a component of the fluid system in the absence of an intervening length of a conduit or tubing wherein the first fluid aperture 25 leads directly to a fluid conveying portion of the associated component.

The male block 20 also includes a first fastener aperture 26 formed therethrough. More specifically, the first fastener aperture 26 extends through the main body 21 of the male block 20 from a first face 27 of the male block 20 facing towards the female block 40 to a second face 28 of the male block 20 formed opposite the first face 27. The first fastener aperture 26 extends axially in a direction parallel to the axial direction of the first fluid aperture 25. The first fastener aperture 26 is cylindrical in shape and devoid of any form of internal threading suitable for engagement with either of the threaded portions 65, 66 of the stud 62. The first fastener aperture 26 is accordingly formed to include an inner diameter greater than the major thread diameter of either of the threaded portions 65, 66 to allow for passage of the stud 62 through the first fastener aperture 26 without substantial interference or engagement.

In the provided embodiment, a leverage heel 30 projects from an end of the main body 21 opposite an end of the main body 21 having the protuberant portion 22 projecting therefrom. The leverage heel 30 projects away from the first face 27 of the male block 20 in a direction parallel to the axial direction of the first fastener aperture 26 and includes an engaging surface 32 arranged parallel to and spaced apart from the first face 27. The leverage heel 30 is configured to leverage the clamping force generated by the fastener assembly 60 to increase the compressive forces applied to the sealing element 80 when compressed between the male block 20 and the female block 40. Although the leverage heel 30 is shown and described as projecting from the male block 20, one skilled in the art should appreciate that the leverage heel 30 may alternatively project from the female block 40 in mirrored fashion without necessarily departing from the scope of the present invention.

The female block 40 is formed from a main body 41 having a recessed portion 42 configured to receive the protuberant portion 22 of the male block 20. The recessed portion 42 defines an annular second seal engaging surface 44 extending primarily in a radial direction of the recessed portion 42. The second seal engaging surface 44 includes one or more teeth or grooves suitable for engagement with the annular sealing element 80 and may mirror the first seal engaging surface 24 of the male block 20 in form and configuration. A second fluid aperture 45 extends transversely from the second seal engaging surface 44 and extends through the main body 41. The second fluid aperture 45 is configured to receive the same fluid conveyed through the first fluid aperture 25 of the male block 20. In some embodiments, the second fluid aperture 45 is configured to receive a conduit or tube (not shown) for conveying the fluid from another component of the fluid system utilizing the block fitting assembly 10. In other embodiments, the female block 40 may be integrally formed with a component of the fluid system in the absence of an intervening length of a conduit or tubing wherein the second fluid aperture 45 leads directly to a fluid conveying portion of the associated component.

The female block 40 also includes a second fastener aperture 46 formed therethrough. More specifically, the second fastener aperture 46 extends through the main body 41 of the female block 40 from a first face 47 of the female block 40 facing towards the male block 20 to a second face 48 of the female block 40 formed opposite the first face 47. The second fastener aperture 46 extends axially in a direction parallel to the axial direction of the second fluid aperture 45. The second fastener aperture 46 is formed in the female block 40 at a position placing the second fastener aperture 46 in axial alignment with the first fastener aperture of the male block 20 to arrange the fastener apertures 26, 46 concentrically. The second fastener aperture 46 is spaced axially from the first fastener aperture 26 by a gap 35 formed by the presence of the leverage heel 30 adjacent the fastener apertures 26, 46. The first fastener aperture 26, the gap 35, and the second fastener aperture 46 cooperate to form a single coextensive aperture passing through an entirety of the assembled male and female blocks 20, 40.

The second fastener aperture 46 is substantially cylindrical in shape and is defined by an inner circumferential surface of the female block 40 formed to include a smaller diameter threaded portion 50 intersecting the second face 48 of the female block 40 and a larger diameter non-threaded portion 52 formed adjacent the threaded portion 50 and intersecting the first face 47 of the female block 40. The threaded portion 50 of the second fastener aperture 46 is internally threaded and includes threads having the requisite structural characteristics for mating with the external threads of the first threaded portion 65 of the stud 62. The threaded portion 50 of the second fastener aperture 46 accordingly includes a major thread diameter substantially equal to the major thread diameter of the first threaded portion 65 of the stud 62 as well as a minor thread diameter substantially equal to the minor thread diameter of the first threaded portion 65 of the stud 62.

The non-threaded portion 52 of the second fastener aperture 46 includes an inner diameter that is greater than the major thread diameter of the threaded portions 65, 66 of the stud 62 and therefore similarly greater than the major thread diameter of the threaded portion 50 of the second fastener aperture 46. The increased inner diameter of the non-threaded portion 52 allows for the threaded portions 65, 66 of the stud 62 to pass therethrough without providing substantial interference.

The non-threaded portion 52 of the second fastener aperture 46 may be formed as a counter-bore of the threaded portion 50 thereof. In other words, the second fastener aperture 46 may be formed by first boring or otherwise machining a cylindrical opening through the female block 40 having an inner diameter substantially similar to the minor thread diameter of the stud 62 before counter-boring the cylindrical opening to cause the non-threaded portion 52 to include an inner diameter greater than the major thread diameter of the threaded portions 65, 66 of the stud 62, wherein the threaded portion 50 of the second fastener aperture 46 may be formed by subsequently tapping the inner surface of the remaining portion of the originally formed cylindrical opening to include the corresponding internal threads. A radially extending surface 55 of the female block 40 is shown as connecting an inner circumferential surface of the threaded portion 50 to an inner circumferential surface of the non-threaded portion 52. The radially extending surface 55 may be formed by an end of the tool performing the counter-boring process on the female block 40, as desired. Alternatively, a frustoconical surface (now shown) extending annularly and arranged at an angle relative to the axial direction of the second fastener aperture 46 may be utilized for connecting the inner circumferential surfaces of the portions 50, 52 in order to form a tapered piloting feature of the second fastener aperture 46 for better locating and aligning the stud 62. If the frustoconical surface is used, it may be formed by further counter-sinking the female block 40 at the intersection between the threaded portion 50 and the non-threaded portion 52 prior to or following the aforementioned counter-boring process.

The various different components forming the block fitting assembly 10 may in some cases be formed from dissimilar materials having variable thermal expansion characteristics. For example, the male block 20 and the female block 40 may be formed from a first material while the stud 62 and the nut 64 may be formed from a second material different from the first material. The blocks 20, 40, the stud 62, and the nut 64 may each be formed from any suitable rigid material, and preferably a rigid metallic material. The described components may be formed from aluminum, stainless steel, or low carbon steel alloys, as non-limiting examples. However, it should be clear to one skilled in the art that the general principles of the present invention may be applied to a block fitting assembly 10 having any combination of materials having differing thermal expansion characteristics, as desired.

In use, the protuberant portion 22 of the male block 20 enters into the recessed portion 42 of the female block 40 with the sealing element 80 positioned between the first and second seal engaging surfaces 24, 44 and with the first and second fastener apertures 26, 46 placed in axial alignment. Next, the first threaded portion 65 of the stud 62 passes through the first fastener aperture 26 of the male block 20, the gap 35, and the non-threaded portion 52 of the second fastener aperture 46 before engaging the threads of the threaded portion 50 of the second fastener aperture 46. The stud 62 is turned relative to the threaded portion 50 to progress the stud 62 axially until the stopping feature 68 of the stud 62 is placed in abutment with the radially extending surface 55, thereby establishing an axial position of the stud 62 relative to the second fastener aperture 46. Next, the nut 64 is received over the second threaded portion 66 of the stud 62 and rotated until the nut 64 engages the second face 28 of the male block 20. Continued rotation of the nut 64 relative to the stud 62 causes the male block 20 to continue to draw towards the female block 40 while the leverage heel 30 aids in applying the compressive forces provided by the fastener assembly 60 to the compression of the sealing element 80. The nut 64 is accordingly turned relative to the stud 62 until a desired compressive force is applied to the sealing element 80 between the cooperating first and second seal engaging surfaces 24, 44.

As shown in FIG. 1, when the block fitting assembly 10 is in the fully assembled configuration, the stud 62 includes a first length 91 thereof in threaded engagement with the nut 64, a second length 92 thereof in threaded engagement with the threaded portion 50 of the second fastening aperture 46, and a free length 93 thereof disposed intermediate the first length 91 and the second length 92 and devoid of engagement with any form of corresponding threads. The first length 91 and the second length 92 represent axially extending portions of the stud 62 that are at least partially restricted from thermally expanding or contracting axially relative to the nut 64 or the threaded portion 50 of the second fastener aperture 46 due to the axial engagement of the external threads of the stud 62 with the internal threads of the nut 64 and the threaded portion 50. The free length 93 accordingly represents a portion of the stud 62 capable of thermally expanding or contracting under strain when the block fitting assembly 10 experiences varying degrees of thermal expansion in the various different components thereof.

The free length 93 includes a combination of a length of the stud 62 present in the first fastener aperture 26, a length of the stud 62 present in the gap 35, and a length of the stud 62 present in the non-threaded portion 52 of the second fastener aperture 46. The inclusion of the non-threaded portion 52 in the second fastening aperture 46 causes the block fitting assembly 10 to include a substantially greater free length 93 in comparison to a traditional configuration wherein substantially the entirety of the aperture formed through the female block is threaded and placed in engagement with a corresponding threaded portion of a suitable threaded fastener. The added free length allows for additional axial expansion or contraction of the stud 62 to occur, thereby allowing for greater compliance or flexibility of the fastening assembly 60 while maintaining a required clamp load during thermal load cycling. The lengthening of the free length 93 of the stud 62 is further achieved without requiring an increase in the total package size of the block fitting assembly 10 due to the non-threaded portion 52 being added to an existing structure in the form of the otherwise threaded second fastener aperture 46. The inclusion of the increased free length 93 of the stud 62 may be considered a thermal expansion compliancy feature of the disclosed block fitting assembly 10.

The length of the non-threaded portion 52 of the second fastening aperture 46 may be selected based on the expected conditions faced by the block fitting assembly 10. For example, the length of the non-threaded portion 52 may be selected based the expected degree of thermal expansion or contraction experienced by each of the male block 20, the female block 40, or any portion of the fastening assembly 60 during thermal load cycling, which is in turn affected by the selection of the materials forming each of the aforementioned components. The length of the non-threaded portion 52 of the second fastening aperture 46 may accordingly be selected to "tune" the block fitting assembly 10 such that the fastener assembly 60 is capable of undergoing a desired degree of strain when subjected to thermal load cycling without compromising the compressive force applied to the sealing element 80.

The non-threaded portion 52 of the second fastener aperture 46 may be formed to be substantially cylindrical in shape for an entirety of the length thereof such that an inner surface thereof is arranged parallel to the axial direction of the second fastener aperture 46. Alternatively, an end of the non-threaded portion 52 intersecting the first face 47 of the female block 40 may be formed to include a frustoconical surface for aiding in piloting the stud 62 therein, wherein the frustoconical surface may be formed by a suitable countersinking process.

The non-threaded portion 52 of the second fastener aperture 46 is distinguishable from the frustoconical piloting features that may be present in the block fittings of the prior art. Specifically, the axial length of the non-threaded portion 52 is greater in comparison to such frustoconical piloting features, and especially when the length of the non-threaded portion 52 is compared to the diameter and length of the corresponding aperture. The non-threaded portion 52 of the second fastener aperture 46 may be selected to have a length with respect to the axial direction of the second fastening aperture 46 that is in the range of 0.1 to 1.5 times the major thread diameter of the first threaded portion 65 of the stud 62. For example, in the illustrated embodiment, the non-threaded portion 52 is 1.5 times greater in length than the major thread diameter of the first threaded portion 65 of the stud 62 to cause the non-threaded portion 52 to extend axially about 45% of the total length of the second fastening aperture 46. However, as mentioned above, the non-threaded portion 52 of the second fastener aperture 46 may extend any desired length suitable for achieving a desired degree of thermal expansion or contraction of the stud 62 according to the expected temperature and pressure conditions faced by the block fitting assembly 10 and the materials selected for forming the block fitting assembly 10.

Figure 2:
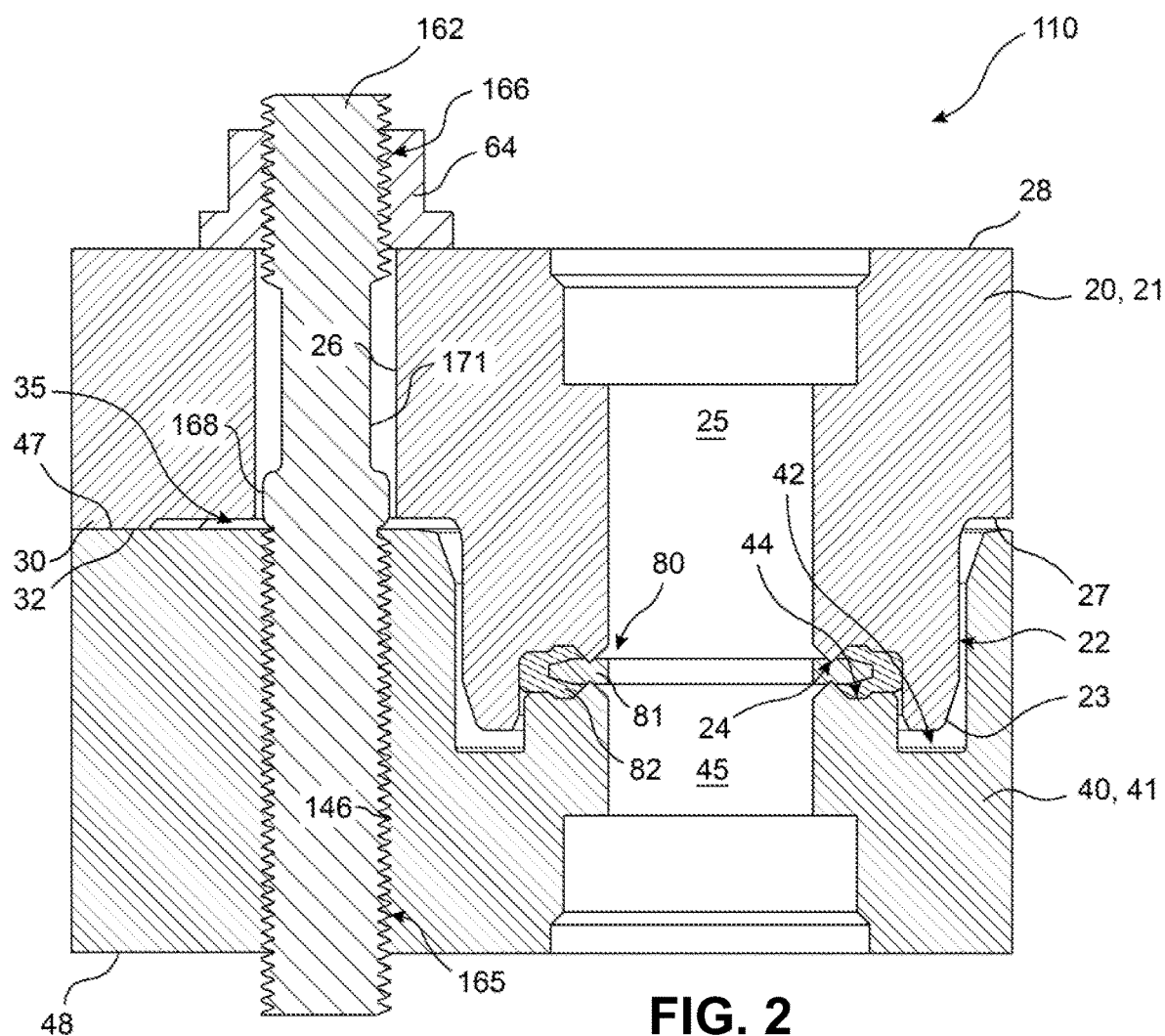
FIG. 2 is a cross-sectional elevational view of a block fitting assembly having a fastener with a necked portion according to another embodiment of the present invention.

FIG. 2 illustrates a block fitting assembly 110 according to another embodiment of the present invention. The block fitting assembly 110 includes a male block 20 and a nut 64 that are each identical to those of the block fitting assembly 10. The block fitting assembly 110 differs from the block fitting assembly 10 by including a modified stud 162 and a modified second fastening aperture 146 formed in an otherwise identical female block 40, hence discussion hereinafter is limited to the specific structure of the stud 162 and the second fastening aperture 146.

The second fastening aperture 146 of the block fitting assembly 110 differs from the second fastening aperture 46 of the block fitting assembly 10 by virtue of the absence of an axially extending non-threaded portion thereof for extending a free length of the stud 162. Instead, an entirety of the second fastening aperture 146 is internally threaded and configured to engage corresponding external threads of the stud 162.

The stud 162 includes a first threaded portion 165 at one end thereof, a stopping feature 168 adjacent the first threaded portion 165, a necked portion 171 adjacent the stopping feature 168, and a second threaded portion 166 at a second end of the stud 162 and adjacent the necked portion 171. The first threaded portion 165 includes external threads configured to mate with the internal threads of the second fastener aperture 46 while the second threaded portion 166 includes external threads configured to mate with the internal threads of the nut 64. The stopping feature 168 has a greater outer diameter than a minor thread diameter of the first threaded portion 165 of the stud 162 in order to establish an axial position of the stud 162 when the stopping feature 168 engages the first face 47 of the female block 40 during a threading of the first threaded portion 165 into the second fastener aperture 146.

The necked portion 171 of the stud 162 includes a smaller outer diameter than the minor thread diameter of either of the threaded portions 165, 166 of the stud 162. For example, the outer diameter of the necked portion 171 may be selected to be between 0.5 and 0.9 times the major thread diameter of the first threaded portion 165, as desired. The necked portion 171 includes the reduced outer diameter in order to allow for greater compliancy and flexibility of the stud 162 intermediate the threaded portions 165, 166 for achieving a similar effect as the increased free length 93 of the stud 62 as disclosed in FIG. 1, but achieved without requiring additional machining of the second fastener aperture 146 such as performing the counter-boring process mentioned hereinabove. The necking of the stud 162 effectively increases an ability of the stud 162 to expand or contract under strain without increasing the overall package size of the block fitting assembly 110. The inclusion of the necked portion 171 may accordingly be referred to as a thermal expansion compliancy feature of the block fitting assembly 110.

A length of the necked portion 171 of the stud 162 may also be selected to provide a desired degree of flexibility and compliancy to the stud 162 intermediate the threaded portions 165, 166 thereof. As such, an entirety or only a portion of the stud 162 disposed intermediate the threaded portions 165, 166 may be formed to include the reduced outer diameter in accordance with the expected operating conditions of the block fitting assembly 210, thereby allowing for the stud 162 to be tuned to include desired thermal expansion characteristics. In the embodiment shown in FIG. 2, the necked portion 171 extends axially for greater than half a length of the first fastener aperture 26, but alternative axial lengths may be used without departing from the scope of the present invention. The stud 162 may be formed in the absence of the disclosed stopping feature 168 to further lengthen the necked portion 171 between the threaded portions 165, 166, as desired, if alternative means of establishing the axial position of the stud 162 are employed. The necked portion 171 may additionally include different axially extending portions having differing outer diameters, as desired, in order to further tune the thermal expansion characteristics of the stud 162.

Figure 3:
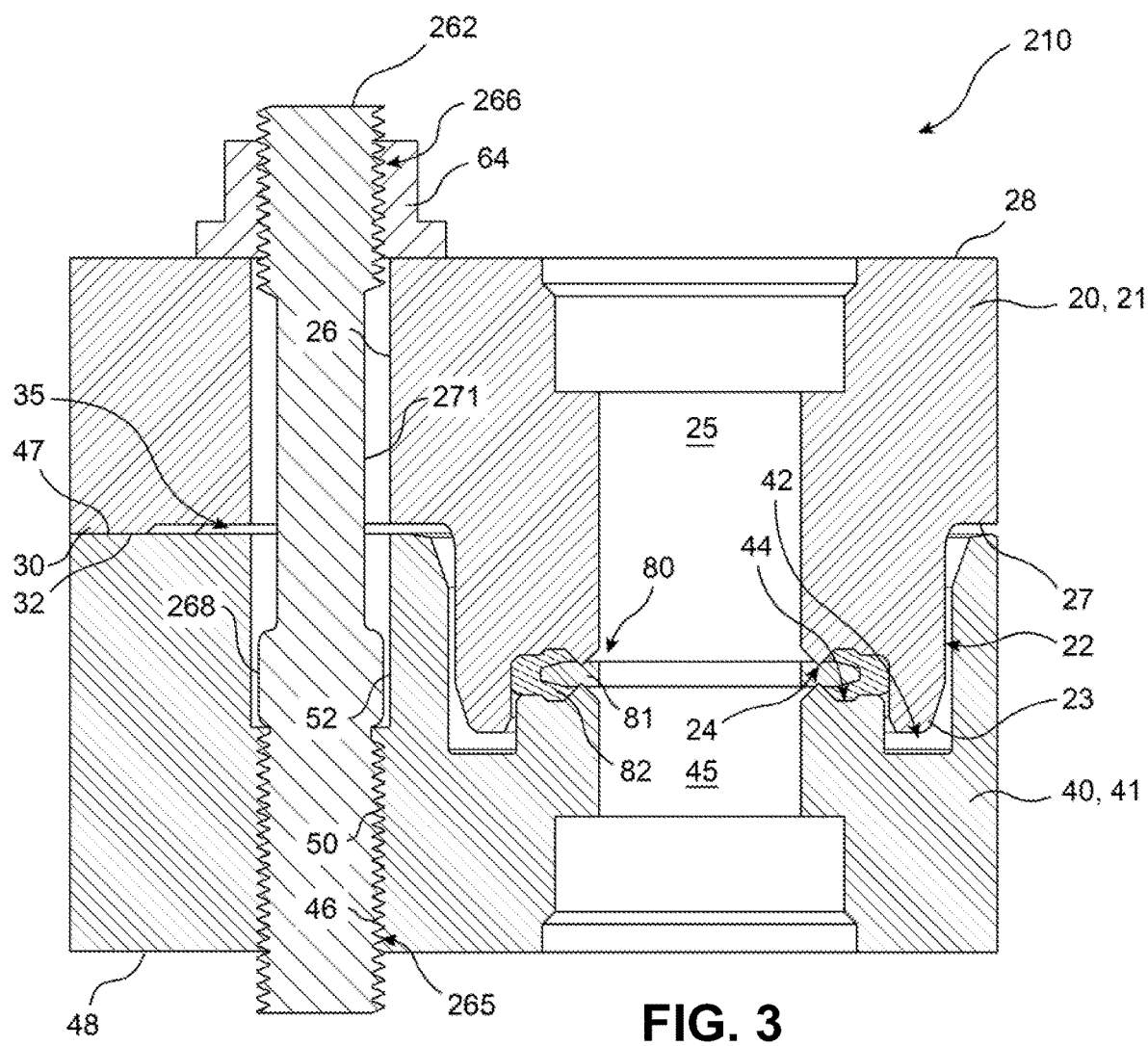
FIG. 3 is a cross-sectional elevational view of a block fitting assembly having both a fastener with an increased free length and a necked portion according to another embodiment of the present invention.

FIG. 3 illustrates a block fitting assembly 210 according to another embodiment of the present invention. The block fitting assembly 210 utilizes a combination of the thermal expansion compliancy features disclosed hereinabove and is substantially identical in structure to the block fitting assembly 10 disclosed in FIG. 1 with the exception of the use of a modified stud 262, hence discussion hereinafter is limited to the structure of the stud 262.

The stud 262 is substantially similar in construction to the stud 162 and includes a first threaded portion 265, a stopping feature 268 adjacent the first threaded portion 265, a necked portion 271 adjacent the stopping feature 268, and a second threaded portion 266 adjacent the necked portion 271. The stud 262 is accordingly substantially similar to the stud 162 except the necked portion 271 of the stud 262 is lengthened to extend across portions of each of the first fastener aperture 26 of the male block 20 and the second fastener aperture 46 of the female block 40 when the stud 262 is in the position shown in FIG. 3.

The stud 262 accordingly includes both an increased axial free length and a decreased outer diameter intermediate the threaded portions 265, 266 thereof, thereby promoting increased flexibility and compliancy of the stud 262 for each of the reasons discussed hereinabove with reference to the block fitting assemblies 10, 110. The block fitting assembly 210 is therefore able to be tuned by either altering the length or outer diameter of the necked portion 271 of the stud 262 or by altering the length of the non-threaded portion 52 of the second fastener aperture 46 of the female block 40.

Figure 4:
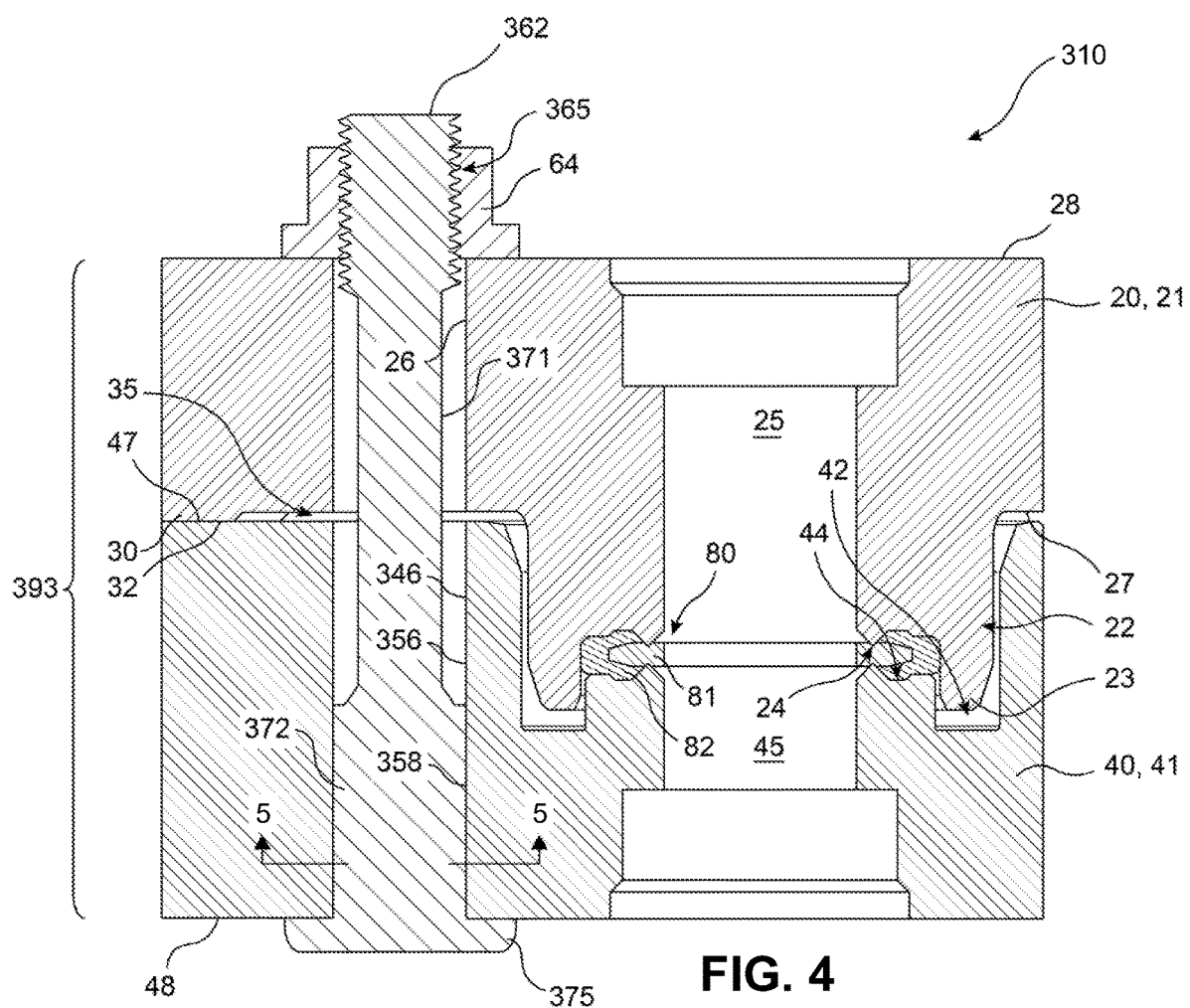
FIG. 4 is a cross-sectional elevational view of a block fitting assembly having a press-fit connection between a fastener and a corresponding block according to yet another embodiment of the present invention.
Figure 5A:
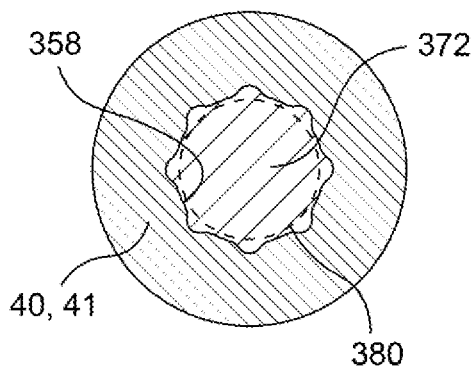
FIGS. 5A-5D illustrate various different cross-sectional shapes of the fastener as taken through section line 5-5 of FIG. 4.
Figure 5B:
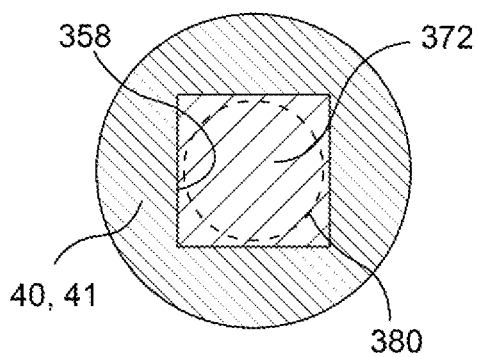
Figure 5C:
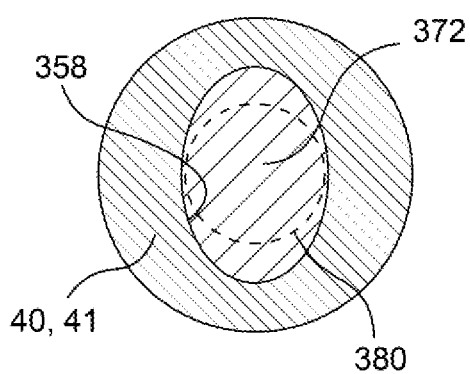
Figure 5D:
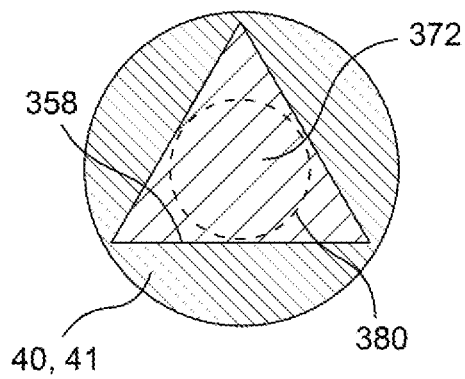

FIG. 4 illustrates a block fitting assembly 310 according to yet another embodiment of the present invention. The block fitting assembly 310 is again substantially identical to the block fitting assembly 10 except for the use of a modified stud 362 and a modified second fastener aperture 346 of an otherwise identical female block 40, hence discussion is again limited to the structure of the stud 362 and the second fastener aperture 346.

The stud 362 includes a threaded portion 365 at one end thereof, a necked portion 371 adjacent the threaded portion 365, a press-fit portion 372 adjacent the necked portion 371, and a head 375 adjacent the press-fit portion 372. The threaded portion 365 is configured to engage the threads of the nut 64 and includes threads having a major thread diameter less than an inner diameter of the first fastener aperture 26. The necked portion 371 is cylindrical in shape and includes an outer diameter smaller than a minor thread diameter of the threaded portion 365. The head 375 forms an annular surface configured to engage the second face 48 of the female block 40 surrounding the second fastener aperture 346.

The second fastener aperture 346 is defined by an inner circumferential surface of the female block 40 and includes a cylindrical portion 356 intersecting the first face 47 of the female block 40 and a receiving portion 358 intersecting the second face 48 thereof. The cylindrical portion 356 includes an inner diameter greater than the major thread diameter of the threaded portion 365 and may include the same inner diameter as the first fastener aperture 26.

The receiving portion 358 includes an inner circumferential surface defining the second fastener aperture 346 having a cross-sectional shape taken perpendicular to the axial direction of the second fastener aperture 346 that corresponds to a cross-sectional shape of the outer surface of the press-fit portion 372 of the stud 362. More specifically, the press-fit portion 372 of the stud 362 may include a substantially identical shape while occupying a greater cross-sectional area than the receiving portion 358 in a manner wherein axial entry of the press-fit portion 372 into the receiving portion 358 causes a desired degree of frictional interference to be present between the press-fit portion 372 and the inner circumferential surface defining the receiving portion 358.

FIG. 5A-5D illustrate various different exemplary cross-sectional shapes used for the interaction between the press-fit portion 372 and the receiving portion 358, wherein each of the disclosed shapes is non-circular and configured to prevent undesired rotation of the stud 362 when received in the second fastener aperture 346. For example, FIG. 5A includes an otherwise substantially circular shape having radially outwardly extending splines, FIG. 5B includes a substantially square shape, FIG. 5C includes a substantially elliptical shape, and FIG. 5D includes a substantially triangular shape. In each depiction, a broken circle 380 represents a perimeter shape of the major thread diameter of the threaded portion 365 in order to illustrate that each of the selected cross-sectional shapes of the receiving portion 358 must accommodate passage of the threaded portion 365 of the stud 362 therethrough when the stud 362 is fully received in the fastening apertures 26, 346.

The block fitting assembly 310 is assembled by passing the threaded portion 365 of the stud 362 through the receiving portion 358, the cylindrical portion 356, and the first fastening aperture 26 until the press-fit portion 372 of the stud 362 encounters the receiving portion 358. The press-fit portion 372 is then press-fit into the receiving portion 358 until the head 375 engages the second face 48 of the female block 40. The nut 64 is then rotated relative to the threaded portion 365 of the stud 362 until the desired clamping force is applied to the blocks 20, 40.

As shown in FIG. 4, the stud 362 beneficially includes an even greater free length 393 thereof devoid of substantial axial interference with a secondary component in comparison to the block fitting assemblies 10, 110, 210 disclosed herein. The free length 393 extends between the nut 64 and the head 375 of the stud 362 and includes the receiving portion 358 of the second fastener aperture 346. Although the press-fit portion 372 is in frictional engagement with the inner surface of the second fastener aperture 346 along the receiving portion 358, the press-fit connection does not necessarily prevent axial expansion or contraction of the press-fit portion 372 relative to the receiving portion 358 due to the lack of intervening radially extending structures such as engaging threads.

In similar fashion to the block fitting assembly 210, the block fitting assembly 310 accordingly includes two different thermal expansion compliancy features by both increasing the free length 393 of the stud 362 while also presenting a reduced diameter necked portion 371 therebetween. The block fitting assembly 310 may accordingly be tuned by varying any of the disclosed characteristics of each of the disclosed thermal expansion compliancy features, as desired.

One skilled in the art should appreciate that the block fitting assemblies 10, 110, 210, 310 disclosed herein may be modified in several respects without necessarily departing from the scope of the present invention. For example, the disclosed fastening apertures may be formed in opposing fashion with respect to the cooperating male and female blocks without necessarily altering the manner of operation of the disclosed invention. Additionally, the disclosed studs 62, 162, 262 may be replaced with any suitable fastener such as a threaded bolt, a clamping screw, or the like while still maintaining the same relationships disclosed herein. For example, if a bolt is used as the fastener, a head of the bolt may be configured to engage the second face 48 of the female block 40 in order to establish an axial position of the bolt while an opposing end of the bolt may be threaded to cooperate with the disclosed nut 64. As such, the bolt may be formed in the absence of any type of stopping feature for establishing the axial position of the bolt as disclosed herein. One skilled in the art will appreciate that additional modifications and alterations may be made to the disclosed block fitting assemblies 10, 110, 210, 310 without departing from the scope of the present invention.

While certain representative embodiments and details have been shown for purposes of illustrating the invention, it will be apparent to those skilled in the art that various changes may be made without departing from the scope of the disclosure, which is further described in the following appended claims.

What is claimed is:

1. A block fitting assembly comprising:
    a first block having a first fastener aperture formed therethrough;
    a second block having a second fastener aperture formed therethrough in axial alignment with the first fastener aperture, an inner surface of the second block defining the second fastener aperture including a non-threaded portion disposed adjacent the first fastener aperture and a threaded portion disposed adjacent the non-threaded portion; and
    a fastener extending through the first fastener aperture and the second fastener aperture to couple the first block to the second block, the fastener including a first threaded portion configured to engage the threaded portion of the second fastener aperture, wherein the fastener includes a stopping feature adjacent the first threaded portion, the stopping feature including an outer diameter greater than a minor thread diameter of the threaded portion of the second fastener aperture and less than an inner diameter of the first fastener aperture, wherein the second block further has a radially extending surface connecting an inner circumferential surface of the threaded portion to an inner circumferential surface of the non-threaded portion, and wherein the stopping feature is supported on the radially extending surface.

2. The block fitting assembly of claim 1, wherein an inner diameter of the first fastener aperture and an inner diameter of the non-threaded portion of the second fastener aperture are each greater than a major thread diameter of the first threaded portion of the fastener.

3. The block fitting assembly of claim 1, wherein the fastener includes a second threaded portion configured to engage a nut, the nut engaging a face of the first block facing away from the second block.

4. The block fitting assembly of claim 1, wherein an axial length of the non-threaded portion of the second fastener aperture is between 10% and 150% a major thread diameter of the fastener.

5. The block fitting assembly of claim 1, wherein the fastener further includes a necked portion having an outer diameter less than a minor thread diameter of the first threaded portion of the fastener.

6. The block fitting assembly of claim 5, wherein the necked portion is at least partially disposed in each of the first fastener aperture and the second fastener aperture.

7. The block fitting assembly of claim 5, wherein the fastener further includes a second threaded portion configured to engage a nut, the necked portion formed intermediate the first threaded portion and the second threaded portion.

8. The block fitting assembly of claim 1, wherein the first block and the second block are formed from a first material and the fastener is formed from a second material different from the first material.

9. A block fitting assembly comprising:
a first block having a first fastener aperture formed therethrough;
a second block having a second fastener aperture formed therethrough in axial alignment with the first fastener aperture; and
a fastener extending through the first fastener aperture and the second fastener aperture to couple the first block to the second block, the fastener including a threaded portion and a necked portion, the necked portion having an outer diameter smaller than a minor thread diameter of the threaded portion, wherein the necked portion of the fastener is disposed adjacent a stopping feature of the fastener having an outer diameter greater than a minor thread diameter of the threaded portion of the fastener and less than an inner diameter of the first fastener aperture.

10. The block fitting assembly of claim 9, wherein the threaded portion of the fastener includes a first threaded portion and a second threaded portion, the necked portion formed between the first threaded portion and the second threaded portion.

11. The block fitting assembly of claim 10, wherein an inner surface of the second block defining the second fastener aperture includes a threaded portion configured to engage the first threaded portion of fastener.

12. The block fitting assembly of claim 11, wherein a nut is configured to engage the second threaded portion of the fastener, the nut engaging a face of the first block facing away from the second block.

13. The block fitting assembly of claim 9, wherein the necked portion is at least partially disposed in each of the first fastener aperture and the second fastener aperture.

14. The block fitting assembly of claim 9, wherein the fastener includes a press-fit portion configured to be axially press-fit into a receiving portion of the second fastener aperture.

15. The block fitting assembly of claim 14, wherein an outer surface of the press-fit portion and an inner surface of the second block defining the receiving portion have substantially the same cross-sectional shape.

16. The block fitting assembly of claim 15, wherein the press-fit portion is prevented from rotating relative to the receiving portion of the second fastener aperture.

17. The block fitting assembly of claim 9, wherein the outer diameter of the necked portion is between 50% and 90% a major thread diameter of the threaded portion of the fastener.

18. A block fitting assembly comprising:
a first block having a first fastener aperture formed therethrough;
a second block having a second fastener aperture formed therethrough in axial alignment with the first fastener aperture, the second fastener aperture including a non-threaded portion disposed adjacent the first fastener aperture and a threaded portion disposed adjacent the non-threaded portion;
an internally threaded nut configured to engage a face of the first block facing away from the second block; and
a fastener extending through the first fastener aperture and the second fastener aperture to couple the first block to the second block, the fastener including a first threaded portion configured to engage the threaded portion of the second fastener aperture and a second threaded portion configured to engage the nut, the fastener further including a necked portion disposed between the first threaded portion and the second threaded portion having an outer diameter smaller than a minor thread diameter of the first threaded portion, wherein the fastener includes a stopping feature adjacent the first threaded portion, the stopping feature including an outer diameter greater than a minor thread diameter of the threaded portion of the second fastener aperture and less than an inner diameter of the first fastener aperture.

* * * * *